United States Patent
Moote et al.

(10) Patent No.: US 8,059,662 B2
(45) Date of Patent: Nov. 15, 2011

(54) SYSTEM AND METHOD FOR CONTROLLING CONTENT AND DELIVERY OF INTERNET PROTOCOL TELEVISION (IPTV) SERVICES

(75) Inventors: Stanley R. Moote, Toronto (CA); John L. Delay, Mason, OH (US); Taras M. Bugir, Golden, CO (US)

(73) Assignee: Harris Corporation, Melbourne, FL (US)

( * ) Notice: Subject to any disclaimer, the term of this patent is extended or adjusted under 35 U.S.C. 154(b) by 104 days.

(21) Appl. No.: 11/733,230

(22) Filed: Apr. 10, 2007

(65) Prior Publication Data

US 2007/0242700 A1 Oct. 18, 2007

Related U.S. Application Data

(60) Provisional application No. 60/792,989, filed on Apr. 18, 2006.

(51) Int. Cl.
- H04L 12/28 (2006.01)
- G01R 31/08 (2006.01)
- H04N 7/10 (2006.01)
- H04N 7/18 (2006.01)
- H04N 7/16 (2011.01)

(52) U.S. Cl. ............ 370/400; 370/252; 725/36; 725/82; 725/144

(58) Field of Classification Search .................. None
See application file for complete search history.

(56) References Cited

U.S. PATENT DOCUMENTS

| | | | |
|---|---|---|---|
| 6,584,082 B1* | 6/2003 | Willis et al. ............... 370/316 |
| 2002/0167524 A1* | 11/2002 | Chen et al. ................ 345/589 |
| 2003/0030866 A1* | 2/2003 | Yoo .......................... 359/128 |
| 2004/0117427 A1* | 6/2004 | Allen et al. ................ 709/200 |
| 2004/0128682 A1* | 7/2004 | Liga et al. .................. 725/35 |
| 2005/0143101 A1* | 6/2005 | Kyperountas et al. ..... 455/456.6 |
| 2005/0166245 A1* | 7/2005 | Shin et al. .................. 725/104 |
| 2005/0286780 A1* | 12/2005 | Takahashi et al. .......... 382/232 |
| 2006/0230176 A1 | 10/2006 | Dacosta ..................... 709/235 |
| 2007/0028258 A1 | 2/2007 | Wollmershauser et al. .... 725/29 |
| 2007/0039018 A1* | 2/2007 | Saslow et al. .............. 725/22 |
| 2007/0044123 A1 | 2/2007 | Zriny et al. ................. 725/52 |
| 2007/0044130 A1 | 2/2007 | Skoog ........................ 725/110 |
| 2007/0047640 A1* | 3/2007 | Venna et al. ............. 375/240.01 |
| 2007/0050336 A1 | 3/2007 | Bugir et al. ................. 707/3 |
| 2007/0050366 A1 | 3/2007 | Bugir et al. ................. 707/9 |
| 2007/0050382 A1 | 3/2007 | Bugir et al. ................. 707/100 |
| 2007/0195707 A1* | 8/2007 | Cidon et al. ................ 370/252 |
| 2007/0199015 A1* | 8/2007 | Lopez et al. ................ 725/31 |
| 2007/0242655 A1* | 10/2007 | Li et al. ..................... 370/352 |
| 2007/0250863 A1* | 10/2007 | Ferguson ................... 725/46 |
| 2008/0235351 A1* | 9/2008 | Banga et al. ............... 709/218 |
| 2009/0010426 A1* | 1/2009 | Redmond ................... 380/29 |
| 2009/0217318 A1* | 8/2009 | VerSteeg et al. ............ 725/32 |
| 2010/0095325 A1* | 4/2010 | Urdang et al. .............. 725/32 |

* cited by examiner

*Primary Examiner* — Kwang B Yao
*Assistant Examiner* — Jutai Kao
(74) *Attorney, Agent, or Firm* — Allen, Dyer, Doppelt, Milbrath & Gilchrist, P.A.

(57) ABSTRACT

A system and method supplies internet protocol television (IPTV) services to a subscriber. A content management subsystem processes and executes integrated workflow functionality for content management of video data to be delivered from a video headend to a subscriber premises. An infrastructure subsystem performs signal processing and routing of the video data from the video headend across the network to subscriber premises based on subscriber requirements at the subscriber premises. A network management, test and monitoring subsystem is coupled with the content management and infrastructure subsystems and includes test and management equipment and control and monitoring systems equipment for monitoring network performance and controlling the infrastructure subsystem and optimizing network performance and video delivery to the subscriber premises.

26 Claims, 3 Drawing Sheets

SYSTEM AND METHOD FOR CONTROLLING CONTENT AND DELIVERY OF INTERNET PROTOCOL TELEVISION (IPTV) SERVICES

RELATED APPLICATION

This application is based upon prior filed copending provisional application Ser. No. 60/792,989 filed Apr. 18, 2006.

FIELD OF THE INVENTION

The present invention relates to communication systems, and more particularly, the present invention relates to internet protocol television (IPTV).

BACKGROUND OF THE INVENTION

High-definition television, computers, set-top boxes and associated personal video recorders (PVR's), gaming consoles, cellular phones and mobile digital media players all receive targeted digital content. These devices are used by millions of consumers at the present time. The capabilities and market penetration are large and will soon increase dramatically.

Typically, these device owners subscribe to various content delivery services, for example, a cable or satellite provider, a high definition (HD) broadcaster, a consumer electronics maker or a telephone company. As customers become increasingly technology-savvy, living in a wireless, time-shifted world, they desire content delivered to whichever device they choose and whenever they desire. Thus, the demands on providers are increasing.

As a result, internet protocol television (IPTV) is becoming increasingly popular and promises to meet many of these future demands by targeting individual subscribers with interactive content and delivering the content to them using multiple services. Many of the current IPTV services, however, do not offer a comprehensive portfolio of total content delivery solutions for building a scaleable, interoperable, cost-effective IPTV architecture. Also, as the media and entertainment industry move to an information technology (IT) model, customers face a learning curve to integrate new revenue-generating business models with an evolving back office. The intelligent management of news, insterstitial material, and long- and short-form programming desirably includes digital news gathering, such that broadcasters and content originators can support end-to-end news gathering and provide shared access to content for different servers. It is possible to leverage industry standards, for example, a media object server (MOS) communication protocol for use in such systems.

An IPTV network would desirably have software modules and associated infrastructure or equipment to manage content delivery and video transport, and monitor the network to maintain quality of service. Some type of localized ad insertion is desirable to reach tightly segmented audiences with localized versions of branded programming. It is also desirable to automate the business rules associated with finding, managing, and distributing digital content along with permutations of the same content to different subscribers. This requires a comprehensive, interoperable, and scaleable number of sub-systems that can operate together in a seamless manner.

SUMMARY OF THE INVENTION

A system and method supplies internet protocol television (IPTV) services to a subscriber. A content management subsystem processes and executes integrated workflow functionality for air time sales, traffic and scheduling, and content management of video data to be delivered from a video headend to a subscriber premises. An infrastructure subsystem performs signal processing and routing, e.g., switching of the video data from the video headend across the network to subscriber premises based on subscriber requirements at the subscriber premises. It can also insert ads. A network management, test and monitoring subsystem is coupled with the content management and infrastructure subsystems and includes test and management equipment and control and monitoring systems equipment for monitoring network performance and controlling the infrastructure subsystem and optimizing network performance and video delivery to the subscriber premises.

The infrastructures subsystem includes a module for synchronizing and processing video data for level/color control, three dimensional adaptive color decoding, noise reduction, frame synchronization, time based correction, and aspect ratio conversion. A module can transport video data to the subscriber premises having preselected video attributes based on subscriber requirements at the subscriber premises. The video attributes can comprise at least one of picture format, picture quality and compression format. The content management subsystem can include a file transport manager module for storing data regarding video attributes to be transported to a subscriber premises. The video attribute data is forwarded to the infrastructure system such that the video data having preselected video attributes will be transported to a subscriber premises. The network management, test and monitoring subsystem can verify the preselected video attributes have been successfully transported and received at a subscriber premises.

In yet another aspect, the content management subsystem includes a playout/operational automation module that edits and manages news applications and plays-out selected news to a subscriber premises. Localized versions of brand and programming and advertisements for delivery to selected subscriber premises can be inserted within video fed to the subscriber premises. Alarm thresholds for signal levels and time duration can be established. A central operator can view remotely network systems and operation.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1A:
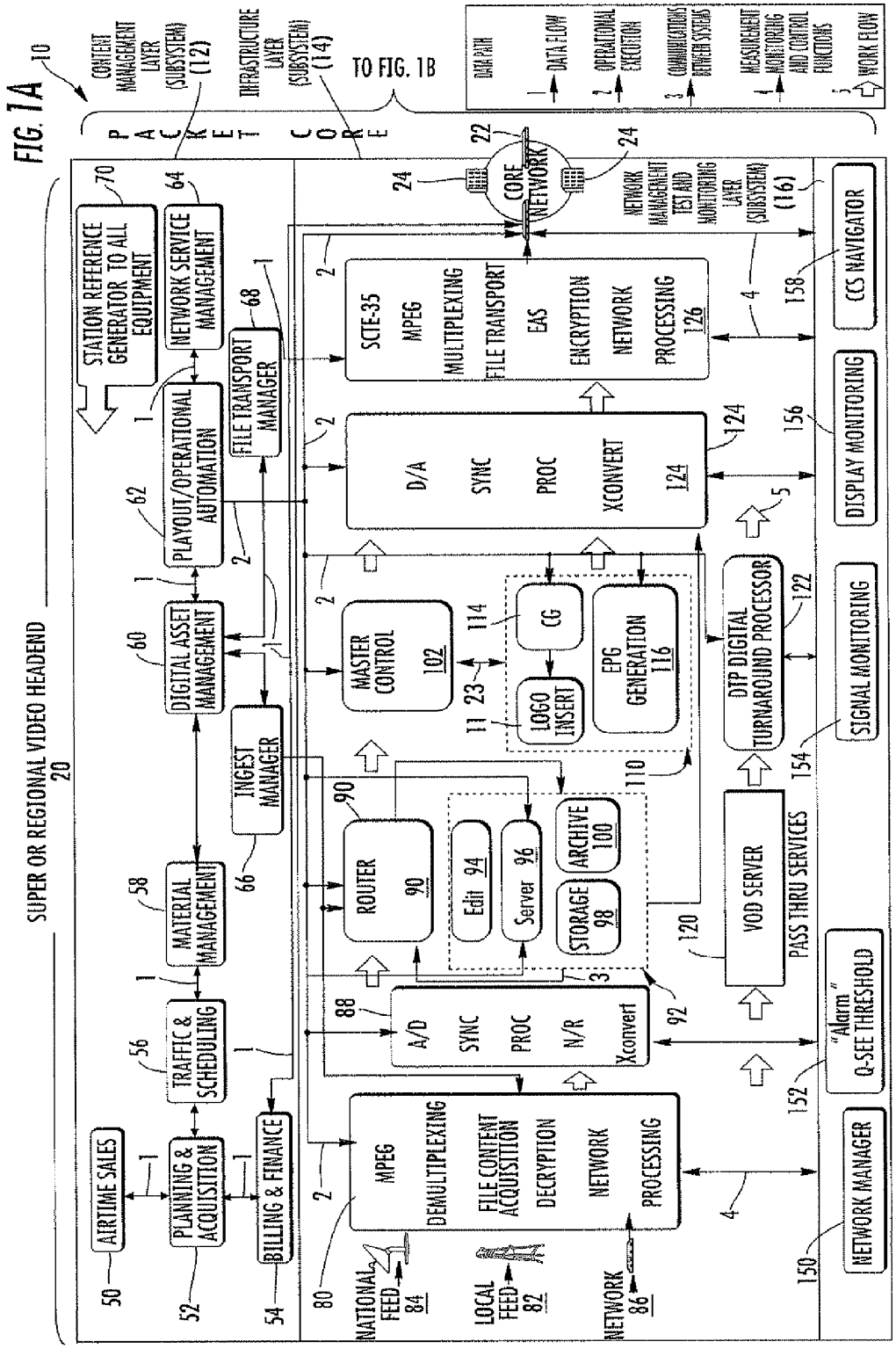
FIGS. 1A and 1B are block diagrams showing the basic components of the IPTV integrated content workflow in accordance with a non-limiting example of the present invention.

Different embodiments will now be described more fully hereinafter with reference to the accompanying drawings, in which preferred embodiments are shown. Many different forms can be set forth and described embodiments should not be construed as limited to the embodiments set forth herein.

Rather, these embodiments are provided so that this disclosure will be thorough and complete, and will fully convey the scope to those skilled in the art. Like numbers refer to like elements throughout.

IPTV distributes television content using the Internet Protocol over a broadband connection and enables a more customized and interactive user experience. This system and method, in accordance with a non-limiting example of the present invention, combines video, data and voice and uses an IPTV head-end as a central facility where programming is acquired, consolidated, processed and managed before distribution across an IPTV network.

The system and method spans three layers (sub-systems) of an IPTV architecture: (1) a business and operations layer as a content management layer for business and operations; (2) an infrastructure layer; and (3) a test, monitoring and control layer for various network management applications. Digital content workflow is delivered and compressed for uncompressed domains at the national, regional or local head-end offices. At the content management layer, various workflow solutions exist for airtime sales, traffic and scheduling, digital asset management and playout automation, and encompasses content management software for a integrated workflow. At the infrastructure layer, various products deliver signal processing, ad insertion, routing, which encompasses switching, and transport services across the core network infrastructure. The test, monitoring and control layer includes a portfolio of test and measuring equipment and control and monitoring systems to maintain optimal network integrity.

Some of the various products that can be incorporated include the various infrastructure, equipment and components manufactured and marketed by Leitch Corporation as part of Harris Corporation of Melbourne, Fla., for signal processing, distribution, test and measurement, and networking. Such infrastructure, components and equipment are found in the 2007 Infrastructure Guide for Leitch (as a brand of Harris Corporation), the disclosure which is hereby incorporated by reference in its entirety. Modules for multi-service video networking processes, signal processing equipment, multi-path/synchronizers, routing switches, servers and test and measurement equipment are included.

Broadcasters and content originators can support end-to-end newsgathering in an application called NewsNet™, which supports full digital news workflow by providing shared access to content hosted on NEXIO™ servers by leveraging industry standards such as the media object server (MOS) communication protocol. NewsNet™ spans the full range of news applications; ingest, editing, management, monitoring, rundown and play-out.

The three subsystems allow a provider to run an IPTV network and provide (1) software to manage content delivery, (2) video infrastructure for reliable program transport, and (3) network monitoring to maintain quality of service.

Localized ad insertion is possible. MSOs and newly emerging service providers rely on their IP networks to reach more tightly segmented audiences with localized versions of branded programming and ads. The localized ad insertion can be used to manage not only the insertion of the localized content, but also the associated branding, from a central location. The system permits new service provisioning. Content originators can apply the H-Class™ Content Delivery Platform to automate intelligently the business rules associated with finding, managing, repurposing, and distributing digital content along with all permutations of the same content to different subscribers. This enables new services to new subscribers by linking H-Class™ Digital Asset Management with H-Class™ Intelligent Transport.

Mobile TV applications are possible. In support of the evolving mobile TV market, customers broadcast content to subscribers using mobile devices. It is possible to deliver content to mobile devices via Atlas™ digital UHF transmitters for DVB-H and FLO™ modulation. A Cool Play™ 1670 MHz transmitter can be used for DVB-H modulation.

Figure 1B:
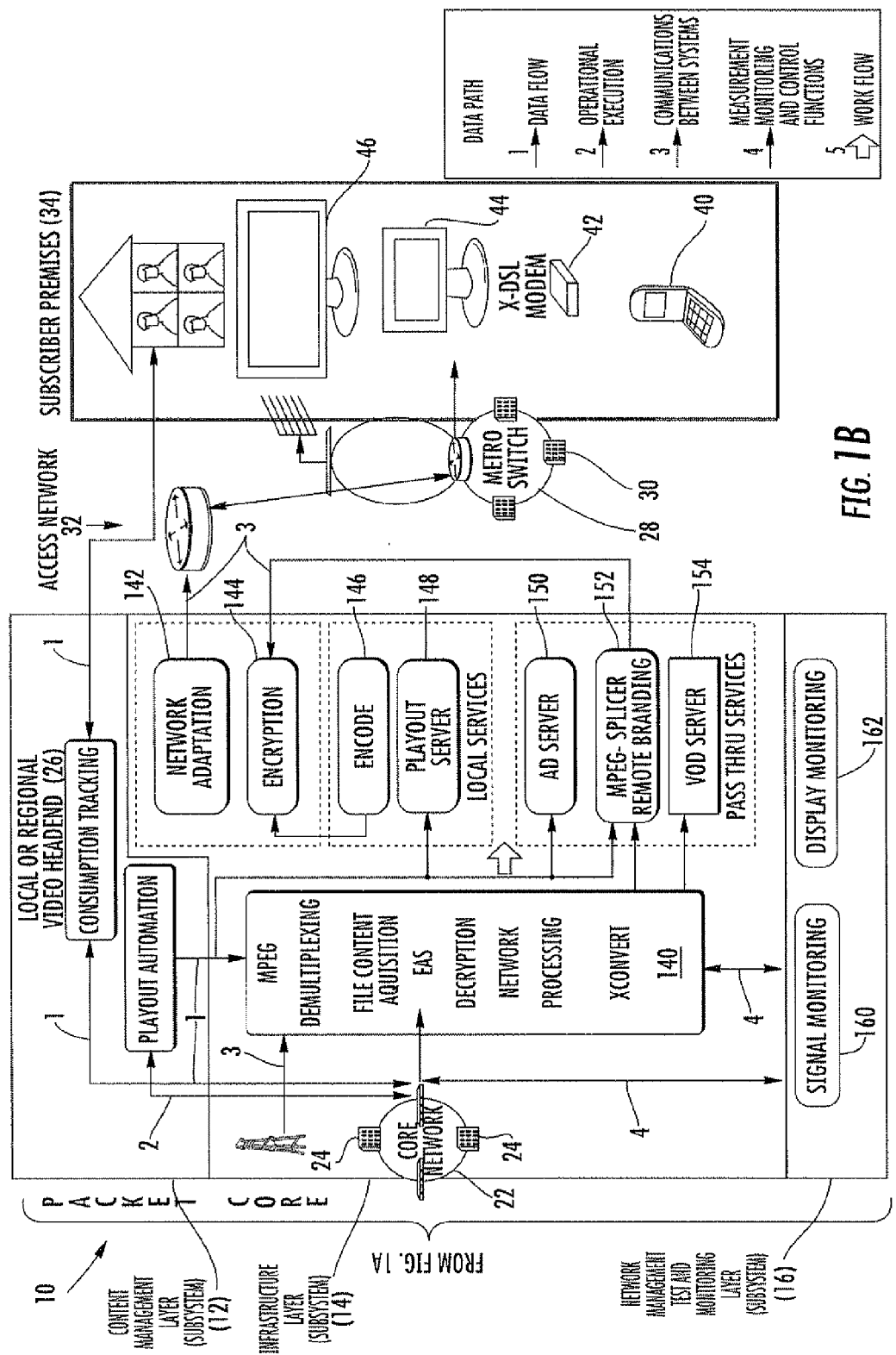

FIGS. 1A and 1B show at 10 a block diagram of the overall system and workflow. Three layers (subsystems) include the content management layer 12, infrastructure layer 14 and test, monitoring and control layer 16. The content management layer (subsystem) 12 includes the business and operational layer for workflow solutions for airtime sales, traffic and scheduling, digital asset management, and playout automation. Content management software modules implement many of these functions and permits integrated workflow.

The infrastructure layer (subsystem) 14 incorporates signal processing, ad insertion, routing and switching, and the transport services across a core network infrastructure. The test, monitoring and control layer (subsystem) 16 optimizes network performance and includes a broad portfolio of test and measurement equipment and control and monitoring systems to maintain optimal network integrity.

These system and methods create and deliver complex cross-delivery advertising campaigns, programming playout, such as selected news for a subscriber premises and other network-based services across a broadband network infrastructure. They are reliable and efficient and work together under common business rules throughout the architecture. The various modules are scaleable, allowing IPTV systems to be built small or large and grow over time, with more channels and services. Advertising revenue can be optimized across multi-channel or multi-service (television, video-on-demand (VOD) and standard or high definition (HD) environments). Providers manage and repurpose content from a common storage platform, from news to production to air. The system and method delivers complete digital content workflow processes in compressed or uncompressed domains at the national, regional or local head-end offices.

Various components can include a H-Class Content Delivery Platform and Applications Suite from Harris Corporation, including applications for traffic, billing, program management, digital asset management, ingest, playout automation and networking. Representative examples of different components in the infrastructure include various modules and systems provided by Harris Corporation, including NetVX™ multi-service video networking products, DTP Digital Turnaround Processors™, Signal processing equipment such as the Leitch X75™ HD/SD multi-path synchronizer; the Panacea™, Integrator GOLD™, and Platinum™ series routing switchers; Leitch NEXIO™ XS servers; Videotek™ test and measurement equipment; and SuiteView™ multi-viewer systems.

Referring again to FIGS. 1A and 1B, a basic workflow overview and a block diagram of the system 10 is illustrated. The Super or Regional Video headend is illustrated at 20 in FIG. 1A, and communicates through a Core Network 22 as part of regional offices 24 with a Local or Regional Video headend 26 that communicates using a metro switch 28 and central offices 30 through an access network 32 to subscriber premises 34. The core network operates using packet generated communications as known to those skilled in the art.

The Super or Regional Video Headend 20 and the Local or Regional Video Headend 26 can use an H-class platform content management architecture from Harris Corporation. The metro switch 28 can operate with various communication protocols including ADSL. The subscriber premises 34 typically include basic communication components, including cellular telephones 40, X-DSL modems 42, computers 44, television 46 and other network devices.

As illustrated, the content management layer 12 at the Super or Regional Video Headend 20 includes various functional modules including an airtime sales module 50, a planning and acquisition module 52, and a billing and finance module 54. These are operable with each other. Other modules include a traffic and scheduling module 56, a material management module 58, a digital asset management module 60, a playout/operational automation module 62, and network service manager module 64, The digital asset management module 60 is operative with an ingest manager module 66 and a file transport manager module 68. A station reference generator 70 is operative with different equipment.

The Local or Regional Video Headend 26 includes a consumption tracking module 72 and playout automation module 74. The consumption tracking module 72 is operative with the subscriber premises 34 to track consumption of content at the premises.

The airtime sales module can keep track of what sales are made by a service provider to different subscribers, and can act as a middleman broker. This information can be used by different vendors. The planning and acquisition module can be used for planning and acquiring different statistics and planning schedules. The billing and finance module maintains tracking over billing and finance of different products to vendors and subscriber premises. The file transport manager module 68 is operative with the infrastructure subsystem 14 to permit files to be transported through the core network 22. Other modules have functions such as described by the functional titles and also explained below.

The infrastructure subsystem 14 includes a front-end module 80 that receives signals from local feeds 82, national feeds 84 and a network 86. The front-end module 80 includes various functions and structures for MPEG, demultiplexing, file content acquisition, decryption, network and processing functions.

A synchronization/processing module 88 includes analog/ digital conversion, synchronization, procedure calls, N/R and Xconvert. A router 90 is operative with a server 92 (shown in dashed lines), including various edit, server, storage and archive modules 94, 96, 98, 100. A master control 102 is operative with a processor subcomponent system 110 and operative with a logo insert module 112, CG module 114, and EPG generation module 116. A video-on-demand (VOD) server 120 allows pass through services and is operative with a digital turnaround processor (DTP) 122 such as manufactured by Leitch of Harris Corporation. Further modules include another synchronization/processing module 124 for digital/analog conversion, synchronization, procedure calls and Xconvert. Before signals reach the core network 22, another backend module 126 allows SCTE-35 functions, MPEG, multiplexing, file transport, EAS, encryption, network and signal processing.

At the Local or Regional Video Headend 36, a front-end module 140 includes similar components such as described relative to the module 80 in the Super or Regional Video Headend 20, and also includes an Xconvert function.

Other modules include a network adaptation module 142, encryption module 144, encode module 146, playout server module 148 for local services, ad server 150, MPEG-splicer remote branding module 152, and VOD server 154 for pass through services.

As shown in the data path legend, the different arrows are numbered and correspond to the data flow (1), operational execution (2), communication between systems (3), measurement monitoring and control functions (4), and the workflow (5).

The network management test and monitoring layer 16 at the Headend 20 includes basic functional components of a network manager module 150, a network monitoring module 152 such as a Q-SEE monitoring system produced by Harris Corporation, a signal monitoring module 154, a display monitoring module 156 and CSS navigator module 158. The Local or Regional Video Headend 26 includes a signal monitoring module and display monitoring module 162. The monitoring module 152 can include alarms based on signal thresholds.

Many of the components in the infrastructure subsystem 14 include those associated with signal processing, distribution, test, measurement, and networking such as manufactured by Leitch of Harris Corporation in Melbourne, Fla. The signal processing components can be placed in modulator or stand-alone platforms. For example, an X75 component as manufactured by Leitch allows multiple incoming signal formats to be automatically detected and processed and high definition (HD) video and audio conversion functions processed. Signals can be converted to desired formats for hand-off to downstream transmission points. Another platform referred to as NEO® enables unique functionality such as multiviewer displays and modular storage. It includes HDTV glue, conversion, fiber optics and network monitoring and control. The system can use HDTV glue with encoding/decoding, conversion, and embedding/de-embedding of audio signals, plus frame and audio synchronization, and video and audio processing. Audio and metadata can be processed in addition to video. Multiple channel, audio processing occurs. Different fiber optic products such as the OPTO+ family of fiber optic products can be used. A Command Control System (CCS) for flexible monitoring and control of third-party products can be used.

The X75 can operate as a multiple path converter and synchronizer to allow upgrading from SDTV to HDTV. It can include an MPEG function for monitor streaming and video to audio timing tool. Video processing includes level/color control and three dimensional (3D) adaptive color decoding with noise reduction, frame synchronization and time based correction for non-synchronous signals. IP over Ethernet is possible for control and monitoring of signals. Operator control can occur from local or remote control panels for manipulation of video and audio signals. Different Ethernet ports per unit can be used such as for control, monitoring and video thumbnails and other MPEG-4 (CIF) full motion video and audio streaming. A web server and operational SNMP (Simple Network Management Protocol) can control and monitor the system over Ethernet in one non-limiting example.

The command and control system (CCS) Navigator software module enhances remote control aspects, Bidirectional processing is possible between analog, digital and high-definition tape transports and routing systems. HD/SD serial digital legalizers can be incorporated for pixel-by-pixel evaluation and correction and adjustable encoded clip softness with adjustable RGB and encoded limits. Clip levels can be adjusted and the color space. Routers (switches) are incorporated as illustrated. These routers can route digital, analog and data (port) signal formats in the same frame. Some routing can occur with digital routing up to 270 Mb/s per second, including Telco routing and mixed signal routing where no conversion is required. Some routers have 32 input/output groups. Such routers could be sold under the designation Integrator® and Panacea™ by Leitch of Harris Corporation.

Various networking components can be used such as integrated high-speed networking platforms manufactured and sold by Leitch of Harris Corporation. A multi-format test and measurement console sold under the VTM series by Leitch of Harris Corporation can be incorporated. It is operable as a test instrument that monitors and displays multiple inputs simultaneously in a graphic display engine that enables multiple input configurations.

Network monitoring with thumbnails and MPEG-4 streaming can be accomplished with the monitoring devices such as sold under the designation Q-SEE™. Different advanced alarm thresholds such as signal levels and time duration can be accomplished.

Figure 2:
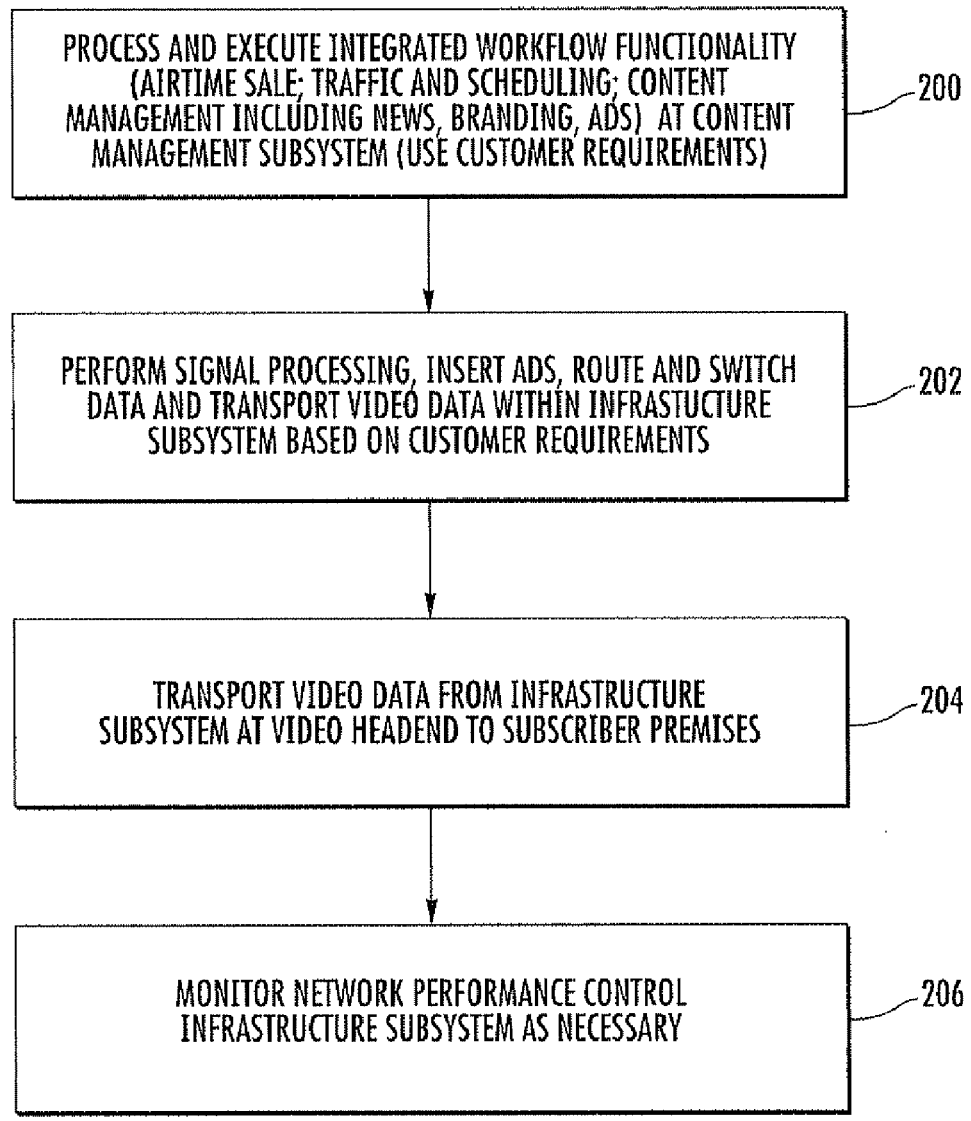
FIG. 2 is a high-level flowchart illustrating a basic method used in accordance with a non-limiting example of the present invention.

FIG. 2 is a high-level flowchart illustrating a basic method in accordance with a non-limiting example of the present invention. The process begins with various inputs such as a national feed, local feed or network feed.

The system processes and executes the integrated workflow functionality such as the airtime sale, traffic and scheduling and content management, including news, branding and ads. This occurs at the content management subsystem and can use customer or subscriber requirements based upon what video is to be delivered to a customer premises (block 200).

In response, the content management subsystem transfers data and instructions to perform signal processing, insert ads, route and switch data and transport video data within the infrastructure subsystem based on the customer or subscriber requirements (block 202).

The video data is transported from the infrastructure subsystem at a video headend to a subscriber premises (block 204). Monitoring can occur at this stage.

Throughout the delivery, the network performance is monitored and results sent back to the monitoring subsystem that can control the infrastructure subsystem and make adjustments as necessary (block 206). This can all occur based upon customer requirements and what type of plans a customer may be subscribed from a network provider or content provider.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for supplying internet protocol television (IPTV) services to a subscriber comprising:
   a content management subsystem configured to process and execute integrated workflow functionality for content management of video data comprising at least one of news, branding and ads to be delivered from a video headend to a subscriber premises wherein said content management subsystem is configured to insert at least one of news, branding and ads, and configured to route and switch data and transport video data using subscriber requirements based on what video is to be delivered to a subscriber premises;
   an infrastructure subsystem coupled with the content management subsystem and operative for receiving video data from the content management subsystem and performing signal processing and routing of the video data corresponding to the video data delivered from the video headend across a network to the subscriber premises, wherein said infrastructure subsystem further comprises a super or regional video headend section comprising circuitry that is configured to convert video data and process the video data digitally without encoding, and a local or regional video headend section configured to receive converted and processed video data from the super or regional video headend section via at least one regional office switch and comprising an encoder and circuitry that is configured to convert video data that had been converted and processed at the super or regional video headend section and process the video data digitally and encode the video data within the encoder before delivery via at least one central office switch to a subscriber premises; and
   a network management, test and monitoring subsystem coupled with the content management and infrastructure subsystems and comprising test and measurement equipment and control and monitoring systems equipment for monitoring network performance during delivery of video data to the subscriber premises and controlling the infrastructure subsystem for optimizing network performance and delivery of video data to the subscriber premises.

2. A system according to claim 1, wherein said infrastructure subsystem comprises a module for synchronizing and processing video data for level/color control, three dimensional adaptive color decoding, noise reduction, frame synchronization, time based correction, and aspect ratio conversion.

3. A system according to claim 1, wherein said infrastructure subsystem comprises a module for transporting video data to a subscriber premises having preselected video attributes based on subscriber requirements at the subscriber premises.

4. A system according to claim 3, wherein said preselected video attributes comprise at least one of picture format, picture quality and compression format.

5. A system according to claim 4, wherein said content management subsystem further comprises a file transport manager module for storing data regarding video attributes to be transported to a subscriber premises.

6. A system according to claim 5, wherein said file transport manager module is operative for forwarding the video attribute data to said infrastructure subsystem wherein video data having preselected video attributes will be transported to a subscriber premises.

7. A system according to claim 6, wherein said network management, test and monitoring subsystem is operative for verifying that preselected video attributes are successfully transported and received at a subscriber premises.

8. A system according to claim 1, wherein said content management subsystem comprises a playout/operational automation module operative for editing and managing news applications and play-out selected news to a subscriber premises.

9. A system according to claim 1, wherein said infrastructure subsystem is operative for inserting localized versions of branded programming and advertisements for delivery to selected subscriber premises.

10. A system according to claim 1, wherein said content management subsystem is operative for distributing selected digital content and permutations thereof to different subscriber premises based on account status and subscriber requirements.

11. A system according to claim 1, wherein said network management, test and monitoring subsystem comprises modules for signal monitoring and having alarm thresholds for signal levels and time duration.

12. A system according to claim 1, wherein said network management, test and monitoring subsystem comprises a display system permitting a central operator to view remotely network systems and operation.

13. A system according to claim 1, wherein said content management subsystem further comprises a billing and finance module operative to process billing and finance data about a subscriber.

14. A system according to claim 1, wherein said content management subsystem processes airtime sales and traffic and scheduling.

15. A system according to claim 1, wherein said infrastructure system performs ad insertion.

16. A system for supplying internet protocol television (IPTV) services to a subscriber comprising:

a content management subsystem configured to process and execute integrated workflow functionality for airtime sales, traffic and scheduling, and content management of video data comprising at least one of news, branding and ads to be delivered from a video headend to a subscriber premises wherein said content management subsystem is configured to insert at least one of news, branding and ads, and configured to route and switch data and transport video data using subscriber requirements based on what video is to be delivered to a subscriber premises;

an infrastructure subsystem coupled with the content management subsystem and operative for performing signal processing, ad insertion, routing and switching, and IPTV transport services of video data corresponding to the video data delivered from the video headend across a network to the subscriber premises, and further comprising a module for synchronizing and processing video data for level/color control, three dimensional adaptive color decoding, noise reduction, frame synchronization, time based correction, and aspect ratio conversion based on subscriber requirements, and wherein said infrastructure subsystem further comprises a super or regional video headend section comprising circuitry that is configured to convert video data and process the video data digitally without encoding, and a local or regional video headend section configured to receive converted and processed video data from the super or regional video headend section via at least one regional office switch and comprising an encoder and circuitry that is configured to convert video data that had been converted and processed at the super or regional video headend section and process the video data digitally and encode the video data within the encoder before delivery via at least one central office switch to a subscriber premises; and a network management, test and monitoring subsystem coupled with the content management and infrastructure subsystems and comprising test and measurement equipment and control and monitoring systems equipment for video processing data at the desired level/color control, three dimensional adaptive color decoding, noise reduction, frame synchronization, time base correction, and aspect ratio conversion and forwarding monitoring data to the infrastructure subsystem and network for optimizing network performance and transport of video data to a subscriber premises based on the requirements at the subscriber premises.

17. A system according to claim 16, wherein said infrastructure subsystem is operative for inserting localized versions of branded programming and advertisements for delivery to selected subscriber premises.

18. A system according to claim 16, wherein said content management subsystem is operative for distributing selected digital content and permutations thereof to different subscriber premises based on account status and subscriber requirements.

19. A system according to claim 16, wherein said network management, test and monitoring subsystem comprises modules for signal monitoring and having alarm thresholds for signal levels and time duration.

20. A method for applying internet protocol television (IPTV) services to a subscriber, comprising:

processing and executing integrated workflow functionality in a content management subsystem for airtime sales, traffic and scheduling and content management of video data comprising at least one of news, branding and ads to be delivered from a video headend to a subscriber premises wherein said content management subsystem is configured to insert at least one of news, branding and ads, and configured to route and switch data and transport video data using subscriber requirements based on what video is to be delivered to a subscriber premises;

performing signal processing, ad insertion, routing and switching and IPTV transport services of the video data corresponding to the video data within an infrastructure subsystem based on subscriber requirements, wherein said infrastructure subsystem further comprises a super or regional video headend section comprising circuitry that is configured to convert video data and process the video data digitally without encoding, and a local or regional video headend section configured to receive converted and processed video data from the super or regional video headend section via at least one regional office switch and comprising an encoder and circuitry that is configured to convert video data that had been converted and processed at the super or regional video headend section and process the video data digitally and encode the video data within the encoder before delivery via at least one central office switch to a subscriber premises;

transporting video data from the infrastructure subsystem at the video headend across a network to subscriber premises; and monitoring network performance during video delivery to the subscriber premises and controlling the infrastructure subsystem and network for optimizing network performance and video delivery to the subscriber premises from a network management, test and monitoring subsystem that is coupled with the content management and infrastructure subsystems.

21. A method according to claim 20, which further comprises synchronizing and processing video data for level/color control, three dimensional adaptive color decoding, noise reduction, frame synchronization, time based correction, and aspect ratio conversion.

22. A method according to claim 20, which further comprises transporting video data to a subscriber premises having preselected video attributes based on at least one of picture format, picture quality and compression format.

23. A method according to claim 20, which further comprises editing and managing news applications at the content management subsystem and play-outing selected news to a subscriber premises.

24. A method according to claim 20, which further comprises inserting localized versions of branded programming and advertisements at the infrastructure subsystem and transporting to selected subscriber premises.

25. A method according to claim 20, which further comprises distributing selected digital content and permutations thereof to different subscriber premises based on account status and subscriber desires.

26. A method according to claim 20, which further comprises monitoring performance of the network and setting alarm thresholds for signal levels and time duration.

\* \* \* \* \*